United States Patent
Heuft et al.

[11] Patent Number: 6,131,720
[45] Date of Patent: Oct. 17, 2000

[54] DEVICE FOR SEPARATING INDIVIDUAL OR A PLURALITY OF ROTATIONALLY SYMMETRIC CONTAINERS UNDER BACKUP PRESSURE

[75] Inventors: Bernhard Heuft, Burgbrohl; Hans-Ulrich Goller, Bonn-Bad Godesberg, both of Germany

[73] Assignee: Heuft Systemtechnik GmbH, Burgbrohl, Germany

[21] Appl. No.: 09/482,224

[22] Filed: Jan. 13, 2000

Related U.S. Application Data

[63] Continuation of application No. 08/875,026, filed as application No. PCT/EP96/05191, Nov. 25, 1996.

[51] Int. Cl.[7] .................................................. B65G 47/46
[52] U.S. Cl. ........................ 198/367; 198/437; 198/442; 198/502.1
[58] Field of Search .................................... 198/367, 368, 198/358, 442, 437, 502.1, 481.1

[56] References Cited

U.S. PATENT DOCUMENTS

| | | | |
|---|---|---|---|
| 3,008,564 | 11/1961 | Lakso | 198/437 |
| 3,130,394 | 4/1964 | Hinz et al. | 198/502.1 |
| 3,326,349 | 6/1967 | Pettis et al. | 198/437 |
| 3,351,198 | 11/1967 | Wyman | 209/111.6 |
| 4,084,686 | 4/1978 | Calhoun | 198/481.1 |
| 4,125,184 | 11/1978 | Seragnoli | 198/367 |
| 4,158,624 | 6/1979 | Ford et al. | 198/367 |
| 4,369,873 | 1/1983 | Heuft | 198/367 |

FOREIGN PATENT DOCUMENTS

| | | | |
|---|---|---|---|
| 1217865 | 5/1966 | Germany . | |
| 22 11 124 | 9/1973 | Germany | B65G 47/64 |
| 28 26 977 C2 | 6/1989 | Germany | B65G 47/71 |

*Primary Examiner*—Joseph E. Valenza
*Attorney, Agent, or Firm*—Gardner, Carton & Douglas

[57] ABSTRACT

The device for separating individual or a plurality of rotationally symmetric containers (11) from a stream of rotationally symmetric containers (10) conveyed under backup pressure comprises a first conveyor path (12) for the stream of containers (10) and a second conveyor path (18) for removal of the separated containers (11), the second conveyor path (18) branching off at a separation point (16) from the first conveyor path (12). The first conveyor path (12) bends at the separation point (16) at an acute angle. A dividing wedge (20) is disposed between the first and the second conveyor (12, 18). A first deflection slide (22) is disposed at the separation point (16) next to the first conveyor path (12) at the side of the branching of the second conveyor path (18) and is extensible towards the tip of the dividing wedge (20), and a second deflection slide (24) is disposed at the separation point (16) next to the first conveyor path (12) at the side of the bend of the first conveyor path (12) and is extensible towards the tip of the dividing wedge (20).

8 Claims, 5 Drawing Sheets

DEVICE FOR SEPARATING INDIVIDUAL OR A PLURALITY OF ROTATIONALLY SYMMETRIC CONTAINERS UNDER BACKUP PRESSURE

This appln is a con't of Ser. No. 08/875,026 filed Jul. 16, 1997 which is a 371 of PCT/EP96/05191 filed Nov. 25, 1996.

BACKGROUND OF THE INVENTION

The invention relates to a device for separating individual or a plurality of rotationally symmetric containers from a stream of rotationally symmetric containers conveyed under backup pressure. The device comprises a first conveyor path for the stream of containers and a second conveyor path for removal of the separated containers, the second conveyor path branching off at a separation point from the first conveyor path. The device further comprises a device for transferring the containers to be separated from the first conveyor path onto the second conveyor path. Since the containers are conveyed under backup pressure, railings which hold the containers on the first conveyor path are disposed to the right and left of the first conveyor path.

The separation of individual containers from a stream of such containers conveyed under backup pressure has up till now been effected exclusively by means of star wheels.

For separating containers, which are not conveyed under backup pressure and are therefore a mutual distance apart, many devices are known, e.g. the segmented separating distributor and the deflection gas nozzles according to EP-A-0 003 111. Said devices are however not suitable for separating containers which are conveyed under backup pressure.

SUMMARY OF THE INVENTION

The object of the invention is to enable separation of individual containers from a stream of such containers conveyed under backup pressure by means of a reliably operating device of the simplest possible design, the stream of containers remaining on the first conveyor path, e.g. a conveyor belt or link chain conveyor.

Said object is achieved according to the invention in that the first conveyor path at the separation point bends at an acute angle towards one side and that the second conveyor path at the separation point branches off from the first conveyor path at an acute angle towards the other side so that a dividing wedge is formed between the first and the second conveyor path, and that a first deflection slide is displaceable between a retracted position, in which it is situated outside of the path of motion of the containers, and an extended position, in which it extends at the side of the branching of the second conveyor path from the start of the separation point towards the tip of the dividing wedge, and that a second deflection slide is displaceable between a retracted position, in which it is situated outside of the path of motion of the containers, and an extended position, in which it extends at the side of the bend of the first conveyor path from the start of the separation point in the direction of the tip of the dividing wedge over at least approximately half of the width of the first conveyor path.

When the first deflection slide is in its extended position and the second deflection slide is in its retracted position, the containers are conveyed on the first, bending, conveyor path. When a container which is to be separated arrives at the separation point, its arrival being detected, for example, by a trigger barrier situated there, the first deflection slide is retracted and the second deflection slide is extended so that the container to be separated is pushed by the containers following behind onto the branching second conveyor path. The first deflection slide is extended once more immediately behind the container to be separated and at the same time the second deflection slide is retracted so that the containers following behind are once more moved forward on the first conveyor path.

When one or more containers are separated from the container stream, the gap created is immediately closed because of the prevailing backup pressure. Closure of the gap temporarily gives rise to a sharp acceleration and a pressure variation which propagates in conveying direction and counter to conveying direction. To prevent the jerky movement of the containers causing an error in the electronic tracking of the individual articles, it is advantageous to provide a device for damping said pressure variation. Such a device may comprise a thin plate, which is disposed on the first conveyor path downstream of the separation point and by means of which the containers are pushed.

The device according to the invention may be part of a drinks-decanting installation. Such drinks-decanting installations have stations, at which the drinks bottles are checked to ensure that they are flawless, clean and free of foreign bodies. Devices for inspecting the bases and walls under backup pressure are described in the simultaneously filed PCT applications "Method and device for conveying containers past a device for inspecting the base of the containers" (our reference: 30562/base inspection) and "method and apparatus for rotating rotationally symmetrical containers, such as bottles, while transporting them under backup pressure" (our reference: 30560/auto-rotation). The fact that both the base inspection and the wall inspection and, according to the present invention, the separation of individual containers found to be defective during inspection are effected under backup pressure means that the entire installation may be substantially simplified because the filling machines which are normally used require backup pressure in the intake region. It is therefore no longer necessary to space out the containers so that they are a mutual distance apart upstream of the devices for base and wall inspection or to build up the backup pressure again afterwards.

The assignment of the result of a base inspection or a wall inspection to the individual containers is effected by means of a FIFO shift register, the content of which is progressively clocked in accordance with the further movement of the containers on the first conveyor path until the relevant container arrives at a light barrier disposed immediately upstream of the separation point. The further movement of the containers on the first conveyor path may be determined by means of a star wheel, which is in engagement with the stream of containers, a CCD line scanning camera, an array of photodiodes or through speed measurement by means of the Doppler effect or the like. Said manner of assignment of the test result to the individual containers is known from installations where the articles are conveyed a mutual distance apart from one another.

Preferably, the dividing wedge is divided in a longitudinal direction and the two parts are displaceable in each case in the direction of their outside edges towards the first and second deflection slide respectively. The respective part of the dividing wedge and the deflection slide meet approximately in the middle of the first or second conveyor paths. A mote precise separation of containers and a higher container throughput rate is therefore possible.

Operation of the separating device at a higher container throughput rate is also enabled by providing, immediately upstream of the deflection slides, swivelling flaps in the railing defining the first conveyor path which already impart to each container a momentum in the direction of the bending part of the first conveyor path or in the direction of the branching second conveyor path, with the result that the change in direction when the containers encounter the first or second deflection slide is less abrupt.

A further possibility of improving separation is to pivotally support the dividing wedge at its broad, downstream end so that the tip of the dividing wedge is capable of swivelling and so, once more, the change in the direction of motion of the individual containers is smaller.

The two deflection slides are advantageously extended by means of pneumatic cylinders. The speed of their extension corresponds approximately to the speed of the containers running past. It is therefore advantageous to be able to control the extension speed of the pneumatic pistons. This is preferably effected by using double-action pistons, the flow resistance of the air exiting from the chamber in front of the piston upon extension of the piston being controllable by means of adjustable throttles. The extension and retraction speed of the piston may alternatively be controlled by providing a plurality of vent ports, which are distributed over the length of the cylinder and are controlled in each case by a valve. When the piston is acted upon at one end by compressed air and the ports at the other end of the piston are successively opened, the piston is displaced in steps in each case as far as the port which has just opened. By said means, the travel distance and also the travel speed of the piston may be controlled. Such cylinders are also suitable for other applications where the extension speed or extension distance is to be variable.

BRIEF DESCRIPTION OF THE DRAWINGS

There follows a description of embodiments of the invention with reference to the drawings. The drawings show.

DETAILED DESCRIPTION

Figure 1:
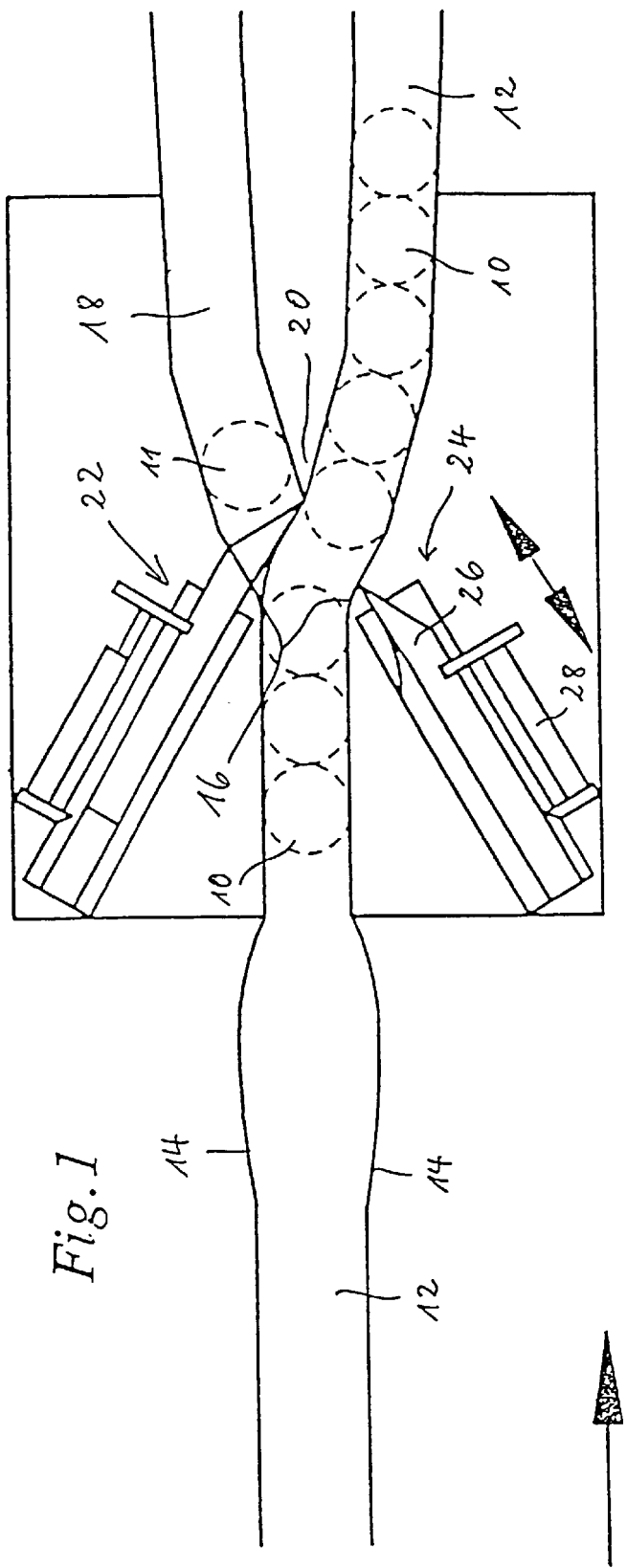
FIG. 1 an embodiment of the device according to the invention having two deflection slides.

According to FIG. 1, empty bottles 10 are conveyed under backup pressure on a first conveyor path 12 which may be, for example, a conveyor belt or a link chain conveyor. The empty bottles 10 are guided on the first conveyor path 12 by means of railings 14. The distance between the two railings 14 is 1 to 10 mm greater than the diameter of the empty bottles 10. At a separation point 16, the first conveyor path 12 bends at an angle of around 30° towards one side, in FIG. 1 to the right, and a second conveyor path 18 branches off likewise at an angle of around 30° towards the other side, in FIG. 1 to the left. In so doing, a dividing wedge 20 is formed between both conveyor paths 12, 18.

In practice, such an arrangement may be realized by using a conveyor belt or a link chain conveyor with a width which is approximately 3 or 4 times the diameter of the empty bottles 10. The empty bottles 10 are guided by the railings 14 on the link chain conveyor. In the case of the bend, the link chain conveyor runs straight on and only the railing 14 is bent. The empty bottles 10 therefore run in the region of the bend slightly obliquely relative to the direction of movement of the link chain conveyor. Similarly, the empty bottles on the branching second conveyor path 18 are displaced by the railing 14 obliquely on the link chain conveyor. Advantageously, three parallel-running link chain conveyors overlap at the separation point, the empty bottles 10 being brought up on the middle link chain conveyor and being displaced by the bending railing 14 onto the link chain conveyor running alongside on the right, while they are displaced by the railing, which branches off in the other direction, onto the link chain conveyor running alongside on the left. It is also possible to guide the containers standing centrally on two link chain conveyors up to the separation point and move them there by means of the device according to the invention onto one of the two conveyor paths 12, 18. The second conveyor path 18 need not be a linear conveyor and may alternatively be a rotary table.

At the separation point 16, i.e. at the start of the forking of the two conveyor paths 12, 18, a first deflection slide 22 and a second deflection slide 24 are disposed on opposite sides of the first conveyor path 12. Each of the two deflection slides 22, 24 comprises a displaceably supported rod 26, which is tapered at the front and may be extended and retracted by means of a pneumatic cylinder 28. The first deflection slide 22 is disposed at the side of the incoming first conveyor path 12 towards which the second conveyor path 18 branches off, and the second deflection slide 24 is disposed at the side of the incoming first conveyor path 12 towards which the first conveyor path 12 bends. In their retracted position, the deflection slides 22, 24 are situated outside of the first and second conveyor paths 12, 18. The two deflection slides 22, 24 are extensible towards the dividing wedge 20 and extend in their extended position over at least half the width of the second and first conveyor paths 18, 12 respectively. Particularly in the case of the second deflection slide 24, it is generally sufficient for it to be extensible only as far as approximately the middle of the width of the first conveyor path 12. The first deflection slide 22 in its extended position bridges the gap arising in the railing 14 as a result of the branching of the second conveyor path 18 so that, when the first deflection slide 22 is extended, all of the empty bottles 10 continue to be conveyed on the first conveyor path 12. When a defective empty bottle 11 which is to be separated arrives at the separation point 16, the second deflection slide 24 extends immediately after the last preceding good bottle so that the defective empty bottle 11 is prevented from moving along on the first conveyor path 12. At the same time, the first deflection slide 22 is retracted so that the empty bottle 11 to be separated is pushed onto the second conveyor path by the backup pressure exerted by the empty bottles 10 following behind. If the next empty bottle is likewise to be separated, the first deflection slide 22 remains in its retracted position and the second deflection slide 24 remains in its extended position. If, on the other hand, the next empty bottle is good and is to be conveyed further on the first conveyor path 12, the first deflection slide 22 is extended once more immediately behind the separated empty bottle 11 and the second deflection slide 24 is retracted, thereby clearing the path again on the first conveyor path 12.

Figure 2:
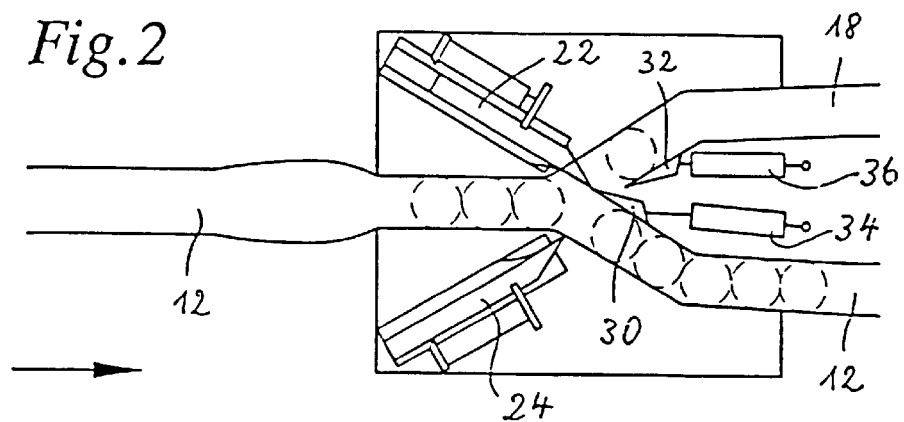
FIG. 2 an embodiment of the device according to the invention having two deflection slides and additionally a dividing wedge divided in longitudinal direction, each of the parts being displaceable.

In the embodiment shown in FIG. 2, instead of a rigid dividing wedge 20, a dividing wedge 20 comprising two movable tips 30, 32 is used. The tips 30, 32 are displaceable by means of pneumatic cylinders 34, 36 towards the first and second deflection slide 22, 24 respectively, thereby shortening the extension distance of the deflection slides 22, 24. The tips 30, 32 are displaceable as far as the middle of the first and second conveyor paths 12, 18 respectively so that the travel distance of the deflection slides 22, 24 is halved. The travel time is therefore reduced, with the result that a higher bottle throughput rate is possible.

Figure 3:
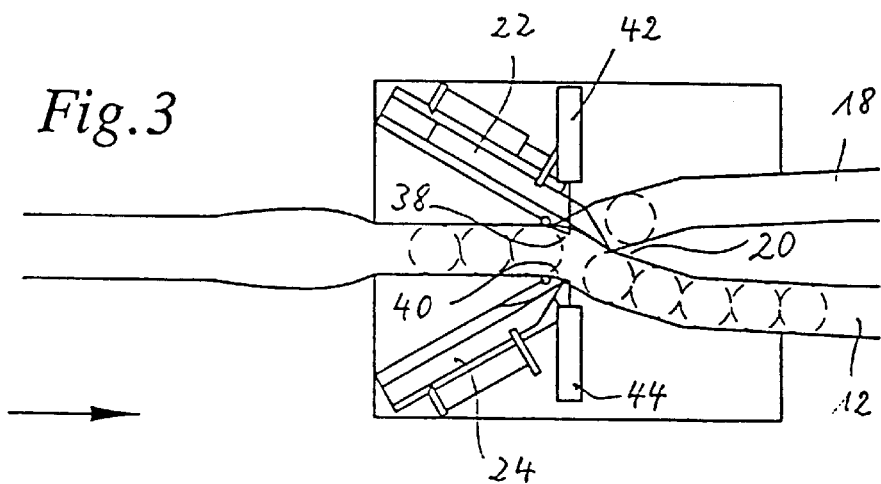
FIG. 3 an embodiment of the device according to the invention having two deflection slides and additionally two deflection flaps.

In the embodiment of FIG. 3, a first and second deflection flap 38, 40 are disposed laterally next to the first conveyor path 12 immediately upstream of or at the separation point 16. The deflection flaps 38, 40 are pivotally supported at their rear end, and their front end directed in conveying direction may be swivelled by means of pneumatic cylinders 42, 44. Shortly before or at the same time as a deflection slide 22, 24 is extended, the deflection flap 38 or 40 situated immediately behind at the same side of the first conveyor path 12 is activated by the associated cylinder 42 or 44 in such a way that it imparts to the next bottle a momentum away from the tip of the deflection slide 22, 24, thereby creating room for the extending deflection slide 22, 24. There is therefore a greater time window for the extension instant of a deflection slide 22, 24. Since, for example, a container 11 which is to be separated has already been given a momentum in the direction of the second conveyor path 18 by the second deflection flap 40, the second deflection slide 24 may even be extended relatively late without there being a risk of the second deflection slide 24 encountering an empty bottle 10.

Figure 4:
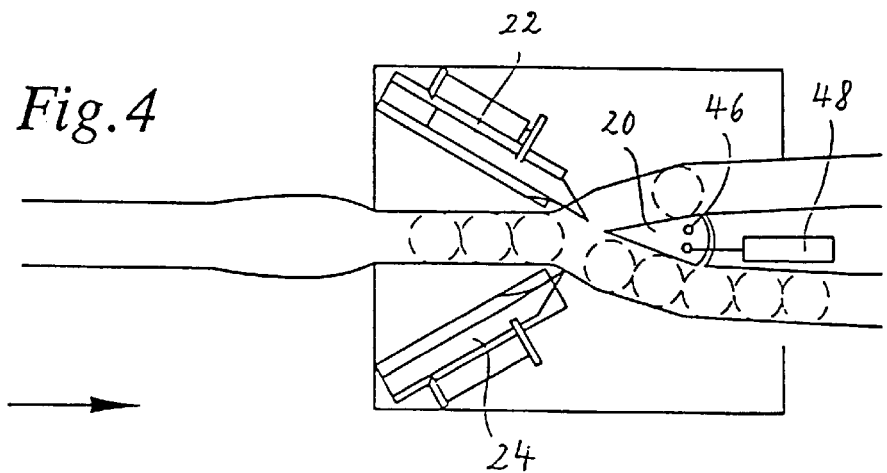
FIG. 4 an embodiment of the device according to the invention having two deflection slides and additionally a swivelling dividing wedge.

In the embodiment of FIG. 4, the dividing wedge 20 is supported at its front broad end so as to be capable of swivelling about an axis 46. Swivelling is effected by means of a pneumatic cylinder 48. Provided no empty bottle is being diverted onto the second conveyor path 18, the dividing wedge 20 is situated in a position in which it is swivelled slightly towards the second conveyor path 18, so that the empty bottles 10 may continue to be conveyed past the dividing wedge 20 on the first conveyor path 12. When an empty bottle 11 to be separated enters the separation point 16, the dividing wedge 20 is swivelled away from the second conveyor path 18 and towards the first conveyor path 12 so that the extension distance for the second deflection slide 24 is slightly shortened. This is a further possible way of increasing the throughput rate of the empty bottles.

Figure 5:
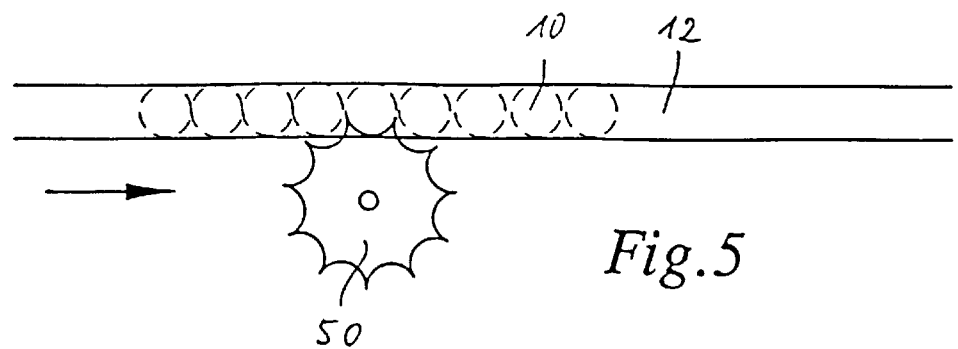
FIG. 5 a plan view of a star wheel which, for determining the conveying speed of the containers, is disposed next to the first conveyor path.

The extension speed of the two deflection slides 22, 24 corresponds approximately to the speed of the empty bottles 10 so that the tip of the deflection slides 22, 24, upon extension, slides between the empty bottles 10 while, as it were, moving along with said empty bottles. Since the speed of the empty bottles 10 when being conveyed under backup pressure may vary dramatically and is lower than the speed at which the first conveyor path 12 is driven, it is advantageous to acquire the speed at which the empty bottles 10 are moving. To said end, according to FIG. 5, a star wheel 50 may be disposed upstream of the separation point 16 next to the first conveyor path 12, which star wheel engages with its teeth between the empty bottles 10 and is driven by the empty bottles 10 as they run past. It is then possible from the rotational speed of the star wheel 50 to determine the speed of the empty bottles 10 and control the extension speed of the first and second deflection slides 22, 24 accordingly. At the same time, it is possible to derive from the rotation of the star wheel 50 clock pulses for the further clocking of the result of a base or wall inspection in a FIFO shift register, so that in each case the control signal pertaining to a specific empty bottle and containing the inspection result is present when the relevant empty bottle travels through a light barrier, which is disposed immediately upstream of the separation point 16 and by means of which a separation process is initiated if said empty bottle 10 has been recognized as defective during the base or wall inspection.

Figure 6:
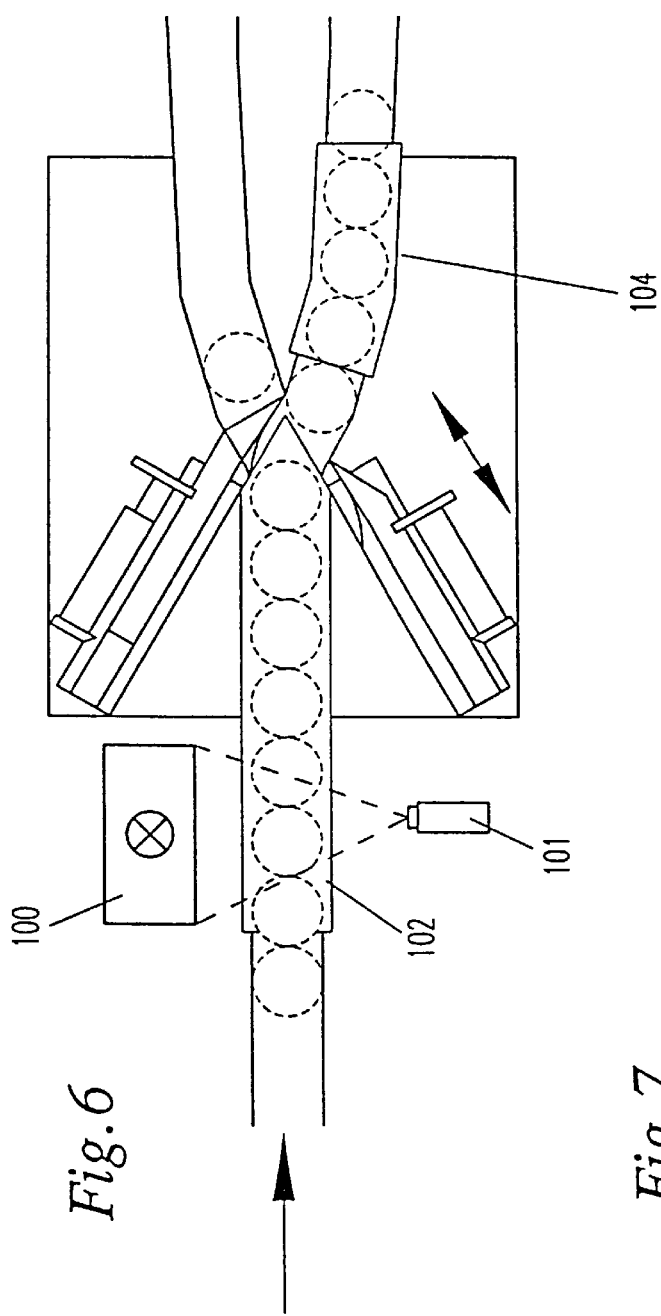
FIG. 6 the device according to the invention combined with a line scanning camera for determining the conveying speed of the containers as well as with a device for damping pressure impulses.
Figure 7:
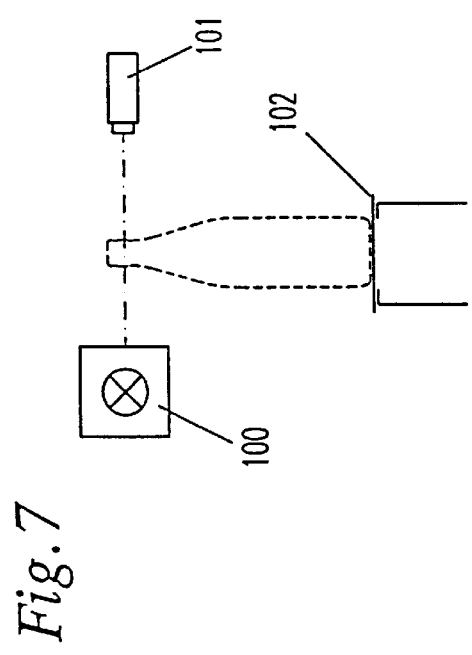
FIG. 7 the line scanning camera for determining the conveying speed of the containers in a section at right angles to the conveying direction.

An alternative possibility of measuring the conveying speed of the bottles is by means of a line scanning camera 101 instead of the star wheel. The line scanning camera is disposed at bottle mouth height laterally on the conveying device opposite a light source 100. The conveying speed is calculated from the sequence of signals of the camera by means of a microprocessor circuit (FIGS. 6 and 7). The container stream may be sharply accelerated in the event of separation of containers owing to the fluctuating pressure conditions. Incorrect measurements may possibly occur as a result. It is possible to counteract said behaviour by setting up a slight mechanical resistance to the container stream in the form of a damping element in the region between line scanning camera and separation point. Said damping element may be realized, for example, by a thin plate 102, which is disposed on the conveyor path and over which the containers glide (FIG. 6).

Figure 8:
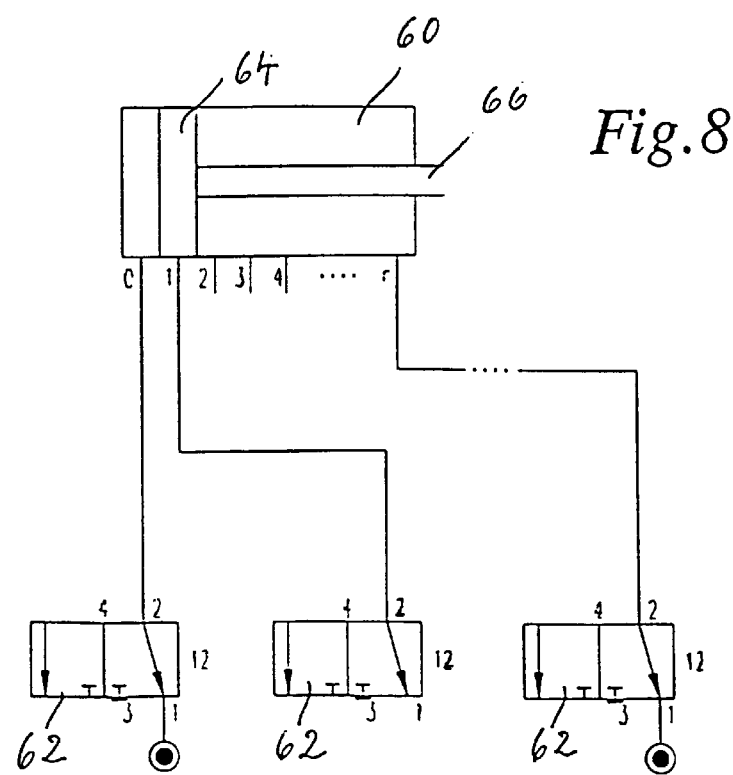
FIG. 8 a diagrammatic view of a cylinder with a gradually extensible piston, and FIG. 9 a diagrammatic view of a cylinder, in which the extension speed of the piston is controllable.

FIG. 8 is a diagrammatic view of a pneumatic cylinder 60 having a plurality of ports 0, 1, 2 . . . n distributed over its length. Each port is connected to a separate control valve 62. A piston 64 with a piston rod 66 is displaceable in the cylinder 60. When the piston 64 in FIG. 8 is to be displaced from its left end position into the right end position, the port 0 is connected by its control valve 62 to a compressed-air source, while the control valves 62 of the other ports are closed. The piston 64 is then unable to travel because air cannot escape at the piston rod end. The port 1 is then vented via its control valve 62, with the result that the piston 64 moves to the right until it closes the opening of the port 1. The control valve 62 for the port 1 may then be closed. Since the piston has already closed the opening of the port 1, control of the control valve 62 is not time-critical. By opening the subsequent ports 2, 3, 4 . . . n, the piston 64 may be moved gradually to the right. By closing port 0 and connecting port n to compressed air, the piston 64 may then be moved gradually to the left by graded-time venting of the valves n−1 to 1 in reverse order. It is therefore evident that the piston 64 may also be held in an intermediate position.

Figure 9:
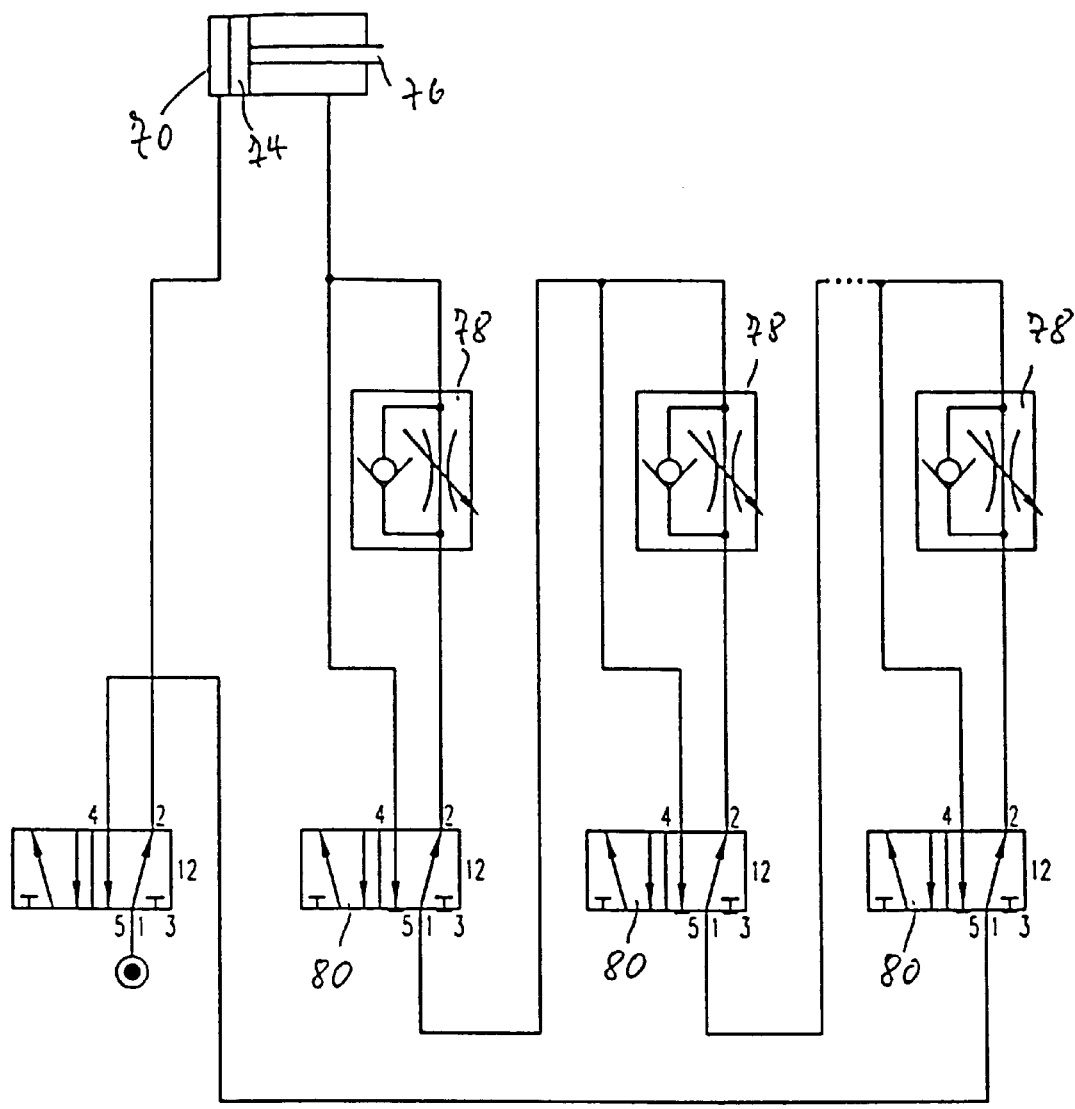

Another possible way of controlling the piston speed is shown in FIG. 9, in which a piston 74 with a piston rod 76 moves inside a cylinder 70. The left end of the cylinder is connectable by a control valve 72 to a compressed-air source, while the right end of the cylinder 70 is throttled at the waste gas side by means of a series of adjustable throttle check valves 78. Each of the throttle check valves 78 may be bridged by means of a control valve 80 and a bypass line. When the piston rod is to be extended at maximum speed, the air is let out through the least throttled valve. The extension speed may be slowed down by using more extremely throttled valves 78 to let the air out. The possibility also exists of using, instead of a plurality of throttle check valves 78 which may be switched over, one throttle valve which is adjusted by means of an actuator. Said adjustment may be effected by means of a stepping motor.

The previously described cylinders 60, 70 are particularly suitable for controlling the extension speed of the deflection slides 22, 24, the extension distance also being adjustable by means of the cylinder 60. Such cylinders may also be used for purposes other than driving the deflection slides 22, 24 of a separating device.

By virtue of the cylinders shown in FIGS. 8 and 9 it is possible to extend the deflection slides 22, 24 initially at an increased speed and then, as the tip of the deflection slide 22, 24 approaches the middle of the conveyor belt and there is a risk of the tip of the deflection slide 22, 24 more or less radially encountering a container 10 and possibly breaking the latter, reduce the extension speed approximately to the conveying speed of the containers 10.

What is claimed is:

1. A device for separating individual rotationally symmetric containers from a stream of rotationally symmetric containers conveyed under backup pressure, comprising a first conveyor path for the stream of containers and a second conveyor path for removal of separated containers, the second conveyor path branching off at a separation point from the first conveyor path, a means for determining the speed of the containers on the first conveyor path upstream of the separation point, characterized in that the first conveyor path bends at an acute angle at the separation point, that a dividing wedge is disposed between the first and second conveyor paths, that a first deflection slide is disposed at the separation point next to the first conveyor path at the side of branching of the second conveyor path and is extensible towards the tip of the dividing wedge that a second deflection slide is disposed at the separation pint next to the first conveyor path at the side of the bend of the first conveyor path and is extensible towards the tip of the dividing wedge, wherein, when the first deflection slide is extended, the containers continue to be conveyed on the first conveyor path and, for separating containers onto the second conveyor path, the second deflection slide is extended and the first deflection slide is retracted, and that the speed determining means control extension speeds of the deflection slides in accordance with the conveying speed of the containers.

2. Device according to claim 1, characterized in that the dividing wedge (20) is subdivided in a longitudinal direction into two tips (30, 32), which are extensible towards the first and towards the second deflection slide (22, 24) respectively.

3. Device according to claim 1, characterized by deflection flaps (38, 40), which are disposed laterally next to the first conveyor (12) at the separation point (16) so as to be capable of swivelling and in their outwardly swivelled state impart to the containers (10) a momentum in the direction of the bend of the first conveyor (12) and in the direction of the branching of the second conveyor (18) respectively.

4. Device according to claim 1, characterized in that the dividing wedge (20) is supported at its front, broad end so as to be capable of swivelling about an axis (46).

5. Device according to therefor claim 1, characterized by a light source (100) and a line scanning camera (101) which are disposed on opposite sides of the first conveyor (12) upstream of the separation point (16), the conveying speed of the containers (10) being determined from the signals produced by the line scanning camera (101).

6. Device according to therefor claim 1, characterized by a device disposed on the first conveyor (12) for damping the backup pressure variations produced by the separation of one or more containers (10).

7. The device according to claim 1 wherein the speed determining means is a star wheel that projects into the stream of containers and is set in rotation by said stream.

8. The device according to claim 1 wherein the speed determining means supplies by means of a clock generator for each revolution a specific number of pulses to an electronic trigger device to control the extension speed for the deflection slides.

* * * * *